Feb. 7, 1956 J. A. RAJCHMAN 2,734,187

STATIC MAGNETIC MATRIX MEMORY

Filed Dec. 29, 1951 5 Sheets-Sheet 1

INVENTOR
Jan A. Rajchman
BY Morris L. Rabkin
ATTORNEY

Feb. 7, 1956 J. A. RAJCHMAN 2,734,187

STATIC MAGNETIC MATRIX MEMORY

Filed Dec. 29, 1951 5 Sheets-Sheet 2

INVENTOR
Jan A. Rajchman
BY Morris [signature]
ATTORNEY

STATIC MAGNETIC MATRIX MEMORY

Filed Dec. 29, 1951 5 Sheets-Sheet 3

INVENTOR
Jan A. Rajchman
BY [signature]
ATTORNEY

STATIC MAGNETIC MATRIX MEMORY

Filed Dec. 29, 1951 5 Sheets-Sheet 4

INVENTOR
Jan A. Rajchman
BY Morris A. Rabkin
ATTORNEY

STATIC MAGNETIC MATRIX MEMORY

INVENTOR
Jan A. Rajchman
BY Morris L. Rabkin
ATTORNEY

United States Patent Office 2,734,187

Patented Feb. 7, 1956

2,734,187

STATIC MAGNETIC MATRIX MEMORY

Jan A. Rajchman, Princeton, N. J., assignor to Radio Corporation of America, a corporation of Delaware Application December 29, 1951, Serial No. 264,217

32 Claims. (Cl. 340—174)

Figure 1:
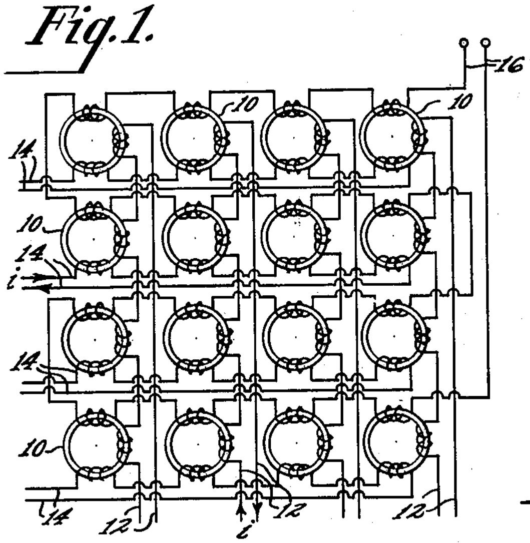

This invention relates to storage devices such as are used in information handling machines, computers and the like. More particularly, this invention is an improved system and apparatus for providing random access and switching of static magnetic storage devices.

There has been described in an application by this inventor filed on September 30, 1950, Serial No. 187,733, for "Magnetic Matrix Memory," a static magnetic storage device consisting of a plurality of saturable magnetic elements arranged, for convenience, in a regular pattern of rows and columns. A system is provided for reading the condition of all the elements. However, only one element at a time is read; therefore, this common reading system can indicate the condition of but one element. Coils are interlaced among the elements so that all the elements in each separate row are inductively coupled by an associated row coil. Furthermore, all the elements in each separate column are inductively coupled by an associated column coil. If one row coil and one column coil are excited by a current, the magnetic element at the intersection of the two coils receives twice the excitation of any other element enclosed by these coils. Accordingly, by a proper amplitude selection of the exciting currents applied to a row coil and a column coil, any desired element at the intersection of the two coils may be saturated to a desired polarity of magnetization without affecting any of the other elements in the matrix. A reading coil is connected to the common magnetic return path of the elements in the matrix. To read the condition of any one of the elements, excitation is applied to the row and column coils coupled to the desired element, always with a given polarity. If there is no output signal detected in the reading coil, then the desired element has the same magnetic polarity as the polarity to which it is being driven by the excited coils. If an output is detected in the reading winding, then the element was in an opposite magnetic polarity to the polarity to which it was driven by the excited coils, and provision is made to restore the original magnetic polarity responsive to such output signal being detected in the reading winding.

In an article by Jay W. Forrester, in the "Journal of Applied Physics," January 1951, page 44, entitled "Digital information storage in three dimensions using magnetic cores," a somewhat similar magnetic matrix memory system is shown. The cores or elements are toroidal in shape, have a separate row coil coupled to all the elements in each different row and a separate column coil coupled to all the elements in each different column. A common reading winding is coupled to all the cores. Selection for determination of the condition of an element in the matrix as well as reading of the condition of a desired element may be made, as previously described, by the excitation of a row and column coil which are coupled to the desired element. In addition, Forrester describes a three-dimensional storage array which consists of a number of the two dimensional arrays positioned in parallel. Selection is made of similarly positioned elements in each array by selecting a row coil and a column coil which are inductively connected to all the similarly positioned rows and columns of elements in all the matrices. A separate third coil is connected to all the similarly positioned elements in separate lines in the third dimension. Thus, by exciting any two of the three coils with a given polarity current and exciting or not exciting each of the third coils with a current which inhibits the particular element, in the particular array, which is at the intersection of the three coils, three-dimensional determination and reading of the magnetic polarity of saturation of an element is obtainable.

Upon examination of either of these systems, it will be seen that for the operation of a two dimensional array of $n^2$ elements, a switching problem exists wherein selection of one out of $n$ rows and one out of $n$ columns, or two out of $2n$ must be made. Although this is simpler than the selection of one out of $n^2$, still, where $n$ is a large number, it will be appreciaed that a considerable and involved switching or selection problem still exists. Most electronic devices which are used in switching the $2n$ channels are unidirectional, since the electron flow in them is in a fixed direction. Consequently, for each row or column there must actually be two electronic devices. These may be coupled in opposite polarities to one coil, or in the same polarity to two oppositely wound coils. Therefore at least $4n$ electronic devices, such as vacuum tubes or crystal diodes, are required to switch into $n^2$ elements. The number of electronic switches has to be still greater than $4n$ if it is desired to express the address in a most concise form in terms of purely binary signals. In this event matrices are required to reduce the base $n$ to the base 2.

Accordingly, it is an object of this invention to provide a novel magnetic matrix switching system and apparatus.

It is a further object of the present invention to provide a magnetic switching system and apparatus which greatly simplifies the problem of switching into a matrix type of storage.

It is still a further object of the present invention to provide a magnetic switching system and apparatus which reduces the number of electronic devices required for driving a matrix type of storage.

Another object of the present invention is to provide an inexpensive magnetic matrix switching system and apparatus.

Yet another object of the present invention is to provide a rapid random access magnetic matrix switching system and apparatus.

These and further objects of the present invention are achieved by driving a main matrix array of saturable magnetic elements, such as has been previously described, by means of windings on other saturable cores, which are themselves arranged in matrices. The central main array is driven by two smaller arrays denoted as row and column driver arrays. Each of these smaller arrays is in turn driven by two smaller row and column arrays. This structure may be extended. In each instance a lowest order array drives a higher order array. The system cumulates in a highest order array. Each element in a row driver array is inductively coupled by means of a coil to all the elements in different rows in the array being driven. Each element in a column driver array is inductively coupled by means of a coil to all the elements in different columns in the array being driven. The number of elements required in a row or column driver array is equal to the number of rows or columns in the array being driven. Therefore, the lowest order arrays have the least number of elements. Selection of a desired element in the highest order array is made by exciting a coil in each of the lowest order row and column driver arrays which, in turn, drive elements in the succeeding higher order arrays which eventually couple to the desired element and drive it.

Figure 2:
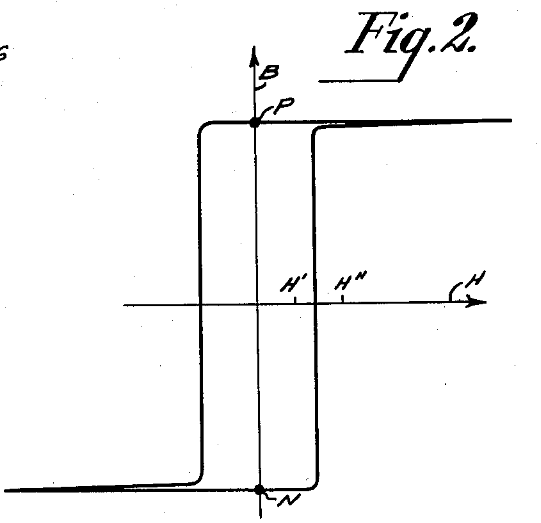
Figure 3:
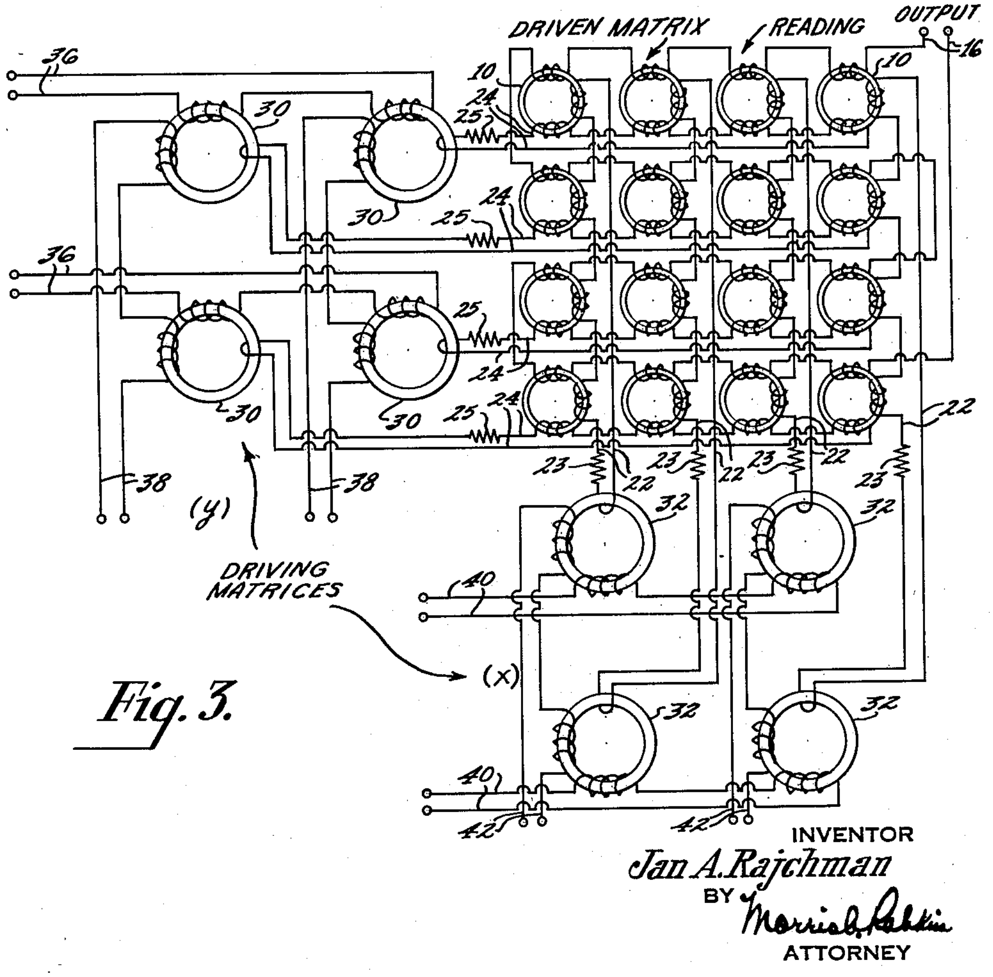
Figure 4:
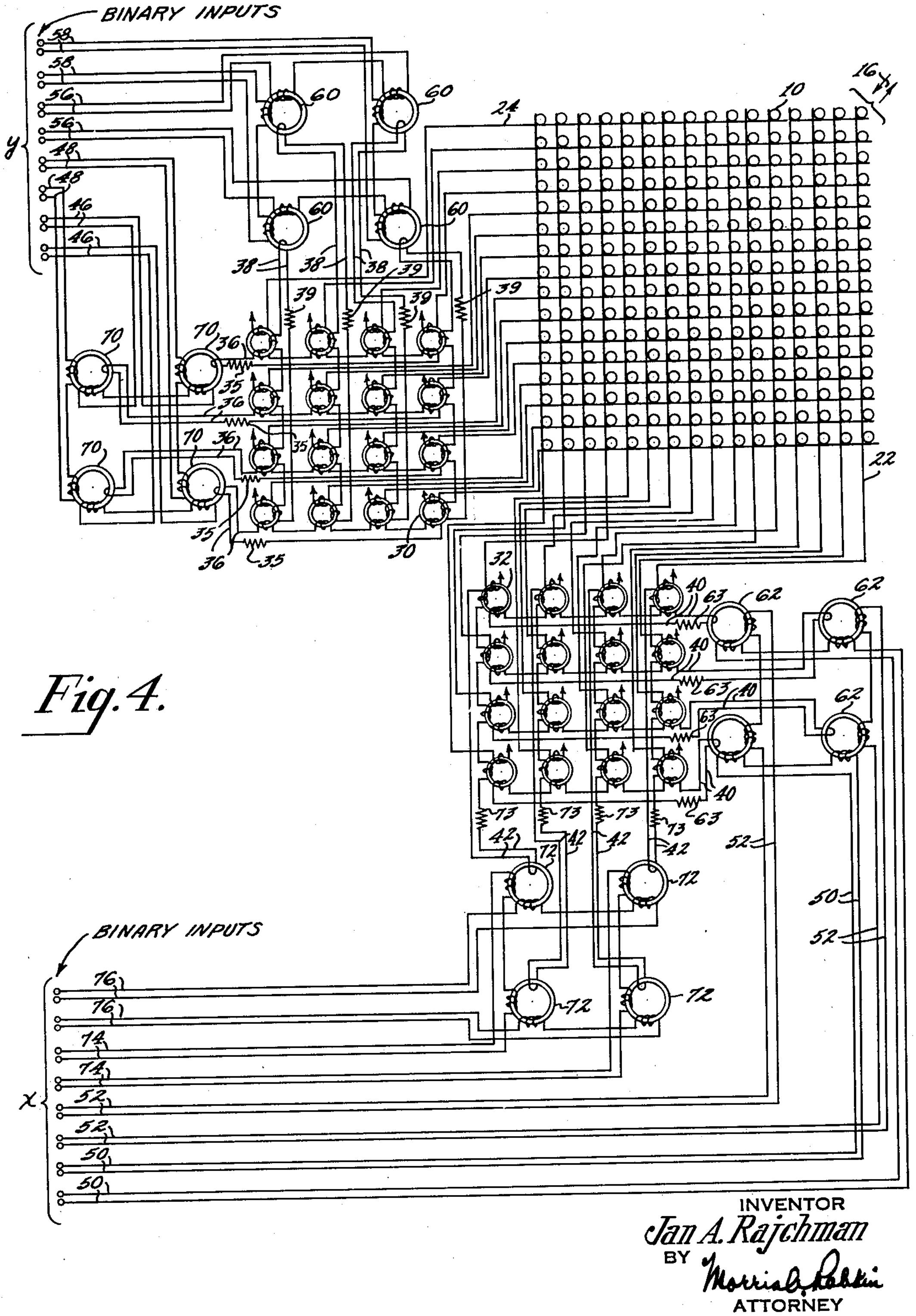
Figure 5:
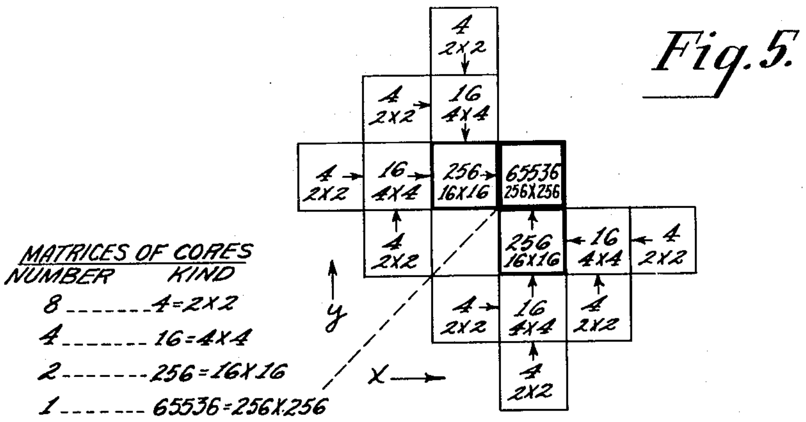
Figure 6:
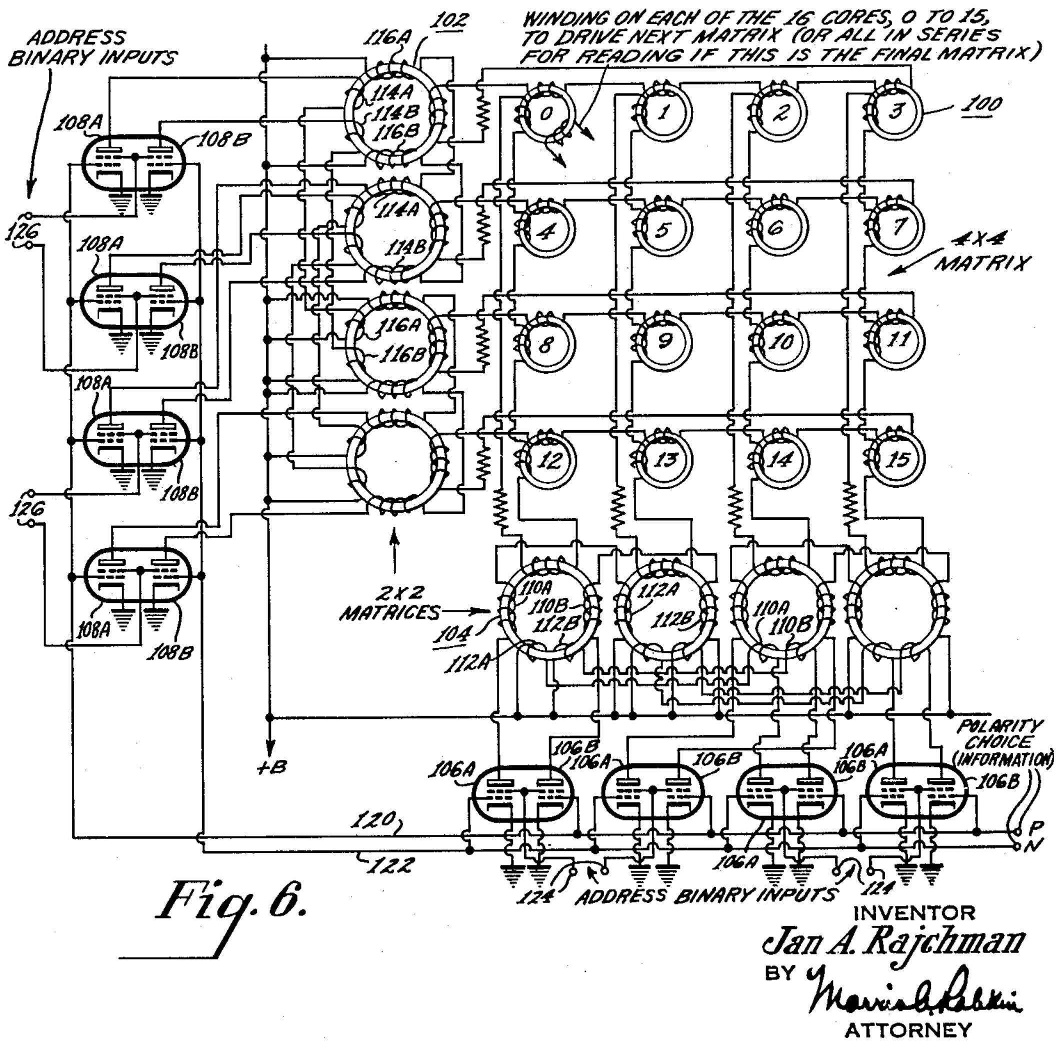
Figure 7:
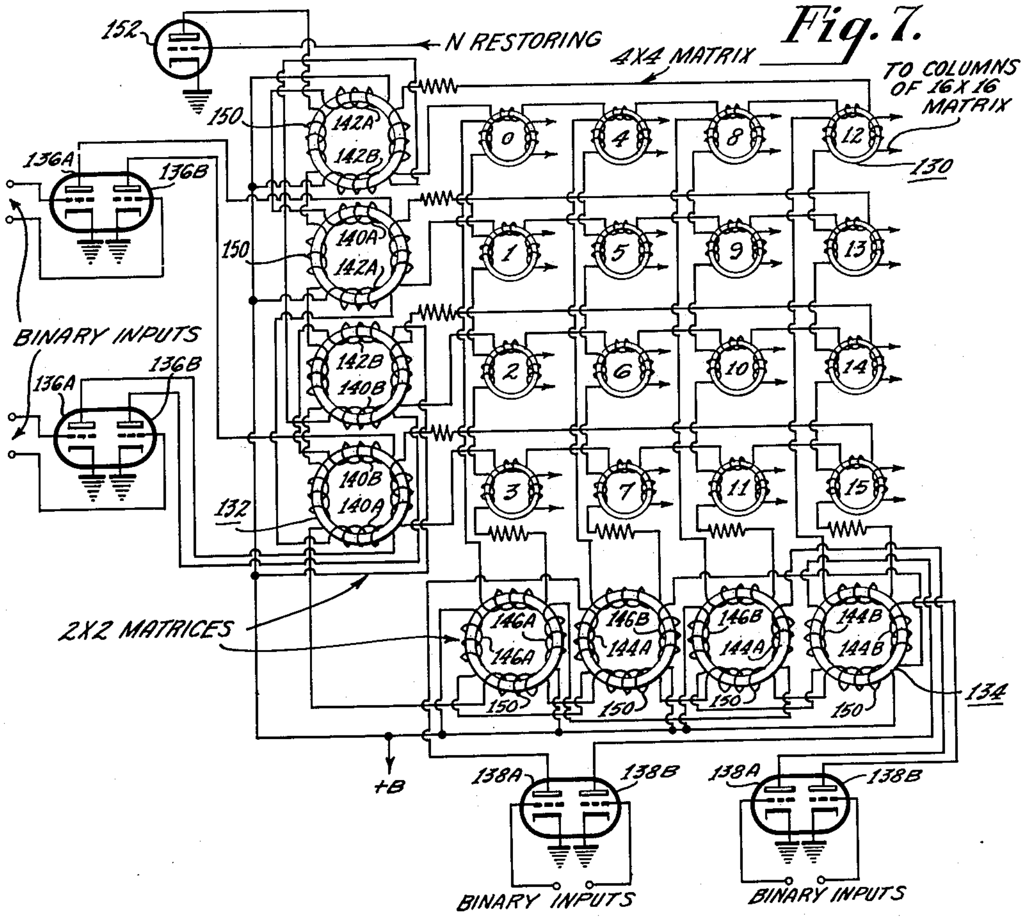
Figure 8:
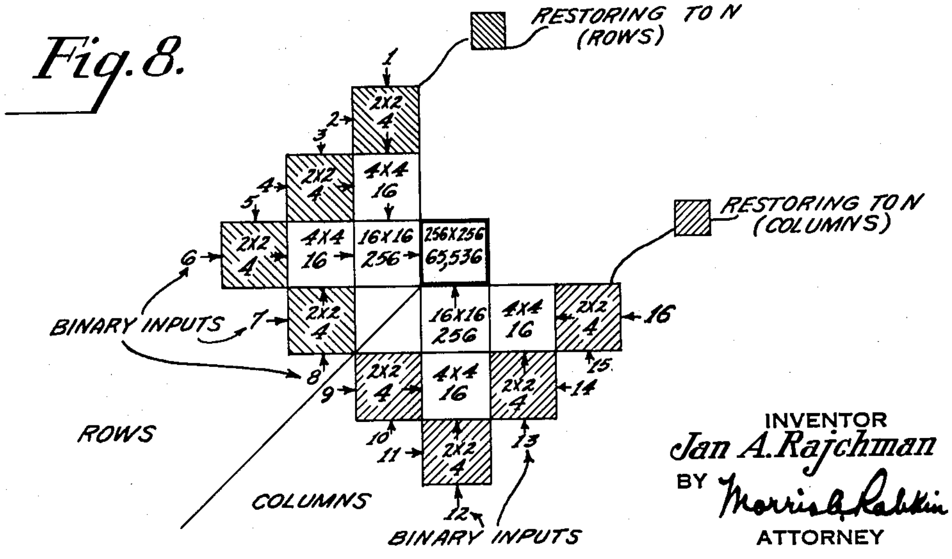
Figure 9:
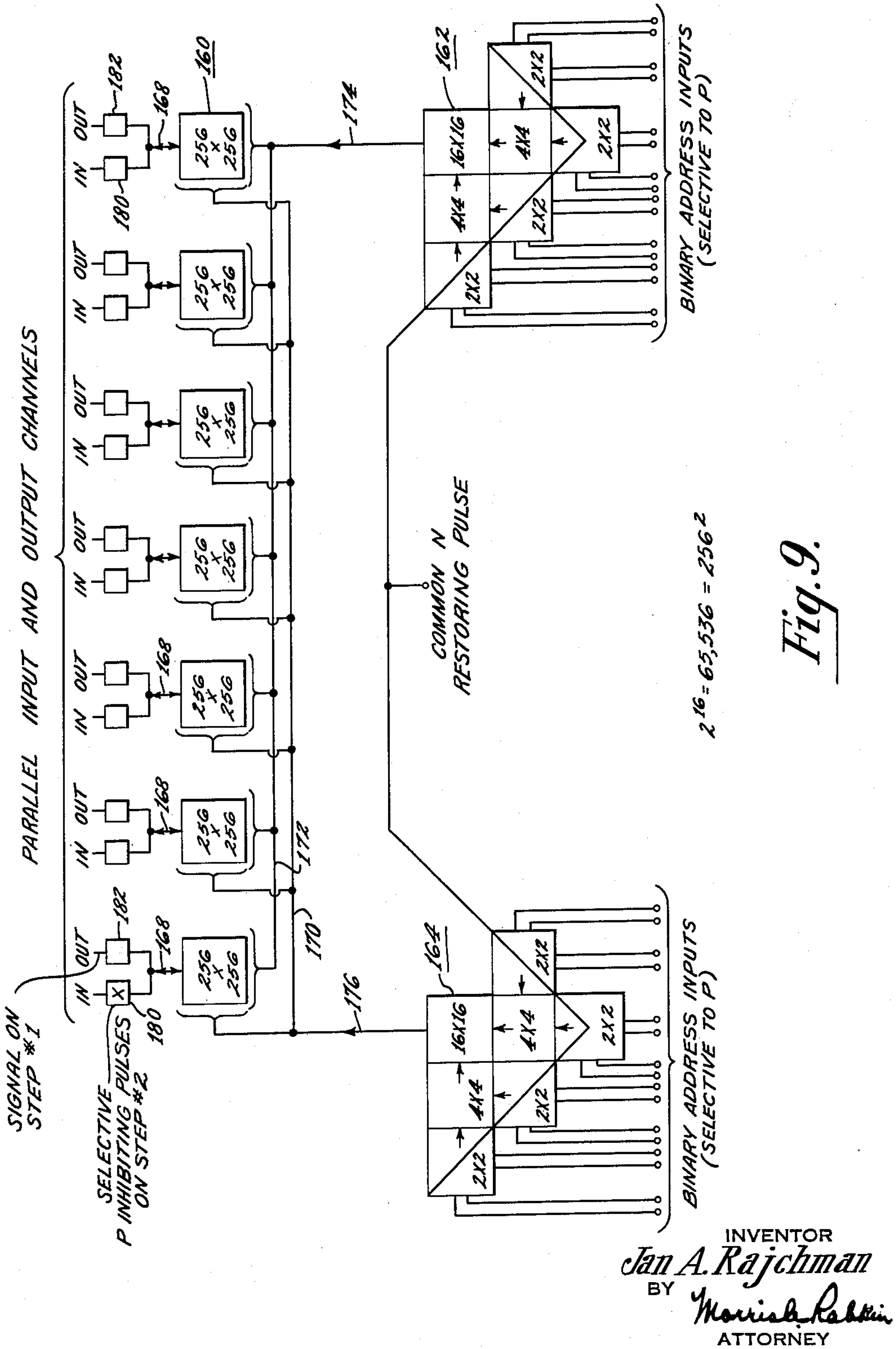

The novel features of the invention as well as the invention itself, both as to its organization and method of operation, will best be understood from the following description, when read in connection with the accompanying drawings, in which Figure 1 represents a known two-dimensional array of toroidal saturable magnetic elements which is shown for the purpose of simplifying the explanation of the present invention, Figure 2 represents a hysteresis curve for any one of the saturable magentic elements of Fig. 1, Figure 3 illustrates schematically one embodimnet of the invention, Figure 4 represents schematically a second embodiment of the invention, Figure 5 represents schematically the results obtainable by extending the principles of this invention, Figure 6 is a schematic of a binary address system electronic matrix combined with the magnetic driver matrices, Figure 7 is a circuit drawing of an embodiment of the invention showing connections for common restoration of the driver matrices, Figure 8 is a schematic diagram of an embodiment of the invention showing cumulative matrices with common restoration of certain lowest order matrices, and Figure 9 is a schematic diagram of a parallel matrix system, which includes a three dimensional array driven by cumulative matrices common to all channels.

Referring now to Fig. 1 of the drawings, there may be seen a two-dimensional array of toroidal saturable magnetic elements 10. Each of the elements 10 in the columns of coils has several turns of wire around one side of the ring of the toroid. These turns are connected in series to constitute a single coil for an entire column 12. Each one of these column coils is brought out to one side (the bottom) of the array. Similarly, row coils 14 are connected to all of the elements in each row and brought out to another side of the array. A third winding is wound around every one of the elements 10 in the array, providing a reading coil 16. Selection of any one of the elements in the array for magnetization in one polarity or another is made by applying an exciting current to a row coil 14 and column coil 12 which are inductively coupled to the desired element. A current *i*, as indicated, is being applied to a row and to a column coil to select an element common to both coils.

The magnetic material, of which each one of the toroidal cores is composed, is selected to have a rectangular hysteresis curve such as the one shown in Figure 2 of the drawings. When a toroidal element is saturated it is left in either condition P or condition N. The excitation which is applied to a row coil alone and the excitation which is applied to a column coil alone is less than that required to drive the magnetic element to either condition P or condition N. The condition P represents saturation in one polarity of magnetization, and the condition N represents saturation in the opposite polarity. The applied excitation is shown on the curve of Fig. 2 as excitation H′. However, the sum of the excitations of the row coil and the column coil, which are applied to a single toroidal element to which both excited coils are coupled, is sufficient to drive the element to either P or N, dependent upon the direction of the current through the row and column windings. The sum of two excitations, for example, is shown on the curve in Fig. 2 as H″ and serves to drive a magnetic element to saturation at P. The non-selected elements, enclosed within a row or a column coil which is excited are excited, at most to excitation H′, as shown in Figure 2, and therefore are not affected, and remain in whatever saturated condition they had before excitation was applied to the selected windings. The condition of an element is determined by driving the element with a magnetomotive force which would drive it to condition P if it is not there already. Accordingly, the common reading winding will detect a change in condition upon application of the reading excitation if the element is in condition N, and will detect no change in condition if the element is in condition P. Further complete details of the operation of a two-dimensional array such as is shown may be found by referring to the article by Jay W. Forrester, as well as by referring to the application by this inventor mentioned previously herein.

Figure 3 illustrates an embodiment of the present invention. A magnetic array, consisting of 16 cores or toroidal elements 10 is shown having the elements in each row connected to a row coil 24 which also has a resistor 25 in series therewith, and the elements in each column are connected to a column coil 22 having a series resistor 23 therein. Each one of the row coils 24 is inductively coupled to a larger toroidal element 30 in a row driver array and each one of the column coils 22 is likewise inductively coupled to a larger toroidal element 32 in a column driver array. In turn, the rows and columns of these elements in the row driver arrays are coupled to row coils 36 and the column coils 38. The rows and columns of elements in the column driver array are also coupled to row coils 40 and column coils 42. The row driver array will also be referred to as the "*y*" array and the column driver array will also be referred to as the "*x*" array. The volumn of the magnetic material in each element in the row and column driver arrays is larger than the volume of the magnetic material in each element of the driven array. All of the elements in the main array are inductively coupled to a single coil termed the reading coil 16.

In order to select, for either writing or reading, an element in the main driven array, selection is made of a single row coil 36 and a single column coil 38 in the row driver array, and of a single row coil 40 and a single column coil 42 in a column driver array. The row and column coils in the respective driver arrays are the ones which couple inductively to respective elements 30, 32 which are inductively coupled respectively to a row coil 24 and a column coil 22 in the main array which, in turn, are both inductively coupled to the desired element 10. Essentially, therefore, what is shown herein is a magnetic switching system whereby the main matrix is driven by windings on other saturable cores which are themselves arranged in arrays.

To understand the operation of the embodiment of the invention shown in Fig. 3, assume that, in the "normal" or standby condition, all the cores of the driver arrays are in a standard condition of saturation such as N. If a row and a column coil 36, 40, 38, 42 in each of the two driving matrices are simultaneously excited to drive a selected element in each driver array to condition P, currents are induced in a row and in a column coil 22, 24 of the main matrix corresponding to the selected cores 30, 32 in the driving matrices. The amplitude of these currents is determined by the voltage induced in the main matrix coils 22, 24 as a result of the change in polarity of magnetization of the selected two elements 30, 32 in the respective row and column driver arrays, and the value of the series resistances 23, 25. This induced voltage will have a fixed value determined by the size and magnetic properties of the driver element, the number of turns of wire around the element, and the speed of turnover. Consequently, the value of the resistance in series with each coil can be chosen so that the current in the row and column coils of the main matrix is such as to provide a maximum discrimination in resultant effects between the desired main array element 10 coupled to both excited coils and the undesired elements 10 coupled to only one of the excited coils.

When an element 30, 32 in each of the driver matrices is driven simultaneously from N to P, the end result is the selection of one core in the main array coupled inductively to these driver array cores and the application of magnetomotive forces to drive it to P (regardless of its previous condition). This drive also leaves one core 30, 32 in each of the driver matrices in condition P, which is not "normal" or standby condition. To restore the normal condition, the elements 30, 32 in the driving matrices are driven to condition N by applying a current to the coupled row and column coils to accomplish this successively in each of the driver arrays. By such successive restoration excitation, only a row coil 24 or a column coil 22 of the main array is excited at a time, and, since, by design, the simultaneous occurrence of driving currents in a row and column coil is required to turn over a core, the successive application of a current in a main matrix row coil and in a main matrix driver coil has no effect on any core in the main array. It is to be noted that, if the elements 30, 32 in the driver arrays were restored simultaneously to their normal condition, the selected core 10 in the main array would be driven from the desired P condition to the undesired N condition. However, if an N condition is desired, it may be seen that the driver arrays, which are normally in N condition, can first both be driven to the P condition and then simultaneously be driven back to the N condition.

To read or interrogate a selected core 10 in the main array, the proper row and column element 30, 32 in the driver matrices, which select the row and column coils in the main array, are simultaneously driven from N to P. If the selected core in the main array is at condition N, a fairly large reading signal will be induced in the reading coil 16 when the selected element turns over. If the core 10 selected was originally at condition P, no signal will be induced in the reading coil. The act of reading an element (if it is in condition N) has the effect of altering the condition of that element. Accordingly, provision is made so that when a signal is detected, upon the reading of an element, that signal is used to restore the normal condition of the driver arrays simultaneously. This has the effect of restoring the condition of the selected element in the main array to what it was originally. If no signal is detected in the reading coils, then the driver arrays must be successively restored to the condition N in order not to affect the condition of the element which is already in the condition P. The sequences of driving pulses on the selected rows and columns of the driving matrices all are summarized in the following table:

TABLE I

*Schedule of pulses for matrix driven matrix*

| Operation Desired on Selected Core of Main Matrix | Row and Column of Driving Matrices Driven to— | |
|---|---|---|
| | Column Driver Matrix $x$ | Row Driver Matrix $y$ |
| Write P: | | |
| Step 1 | P | P |
| Step 2 | N | — |
| Step 3 | — | N |
| Write N: | | |
| Step 1 | P | P |
| Step 2 | N | N |
| Interrogate: | | |
| Step 1 | P | P |
| If signal—Step 2 | N | N |
| If no signal— | | |
| Step 2 | N | — |
| Step 3 | — | N |

Several points about the driving system may now be described. In general the driven core 10 in the main matrix will tend to react back upon the driving cores 30, 32 in the smaller driving matrices. This reaction will have two effects. One is to diminish the magnetizing force of the driving cores, and the other is to diminish the current to magnetize the selected core itself because of the self-induced E. M. F. tending to oppose the E. M. F. on the driving core. If $p$ be the ratio of counter-magnetizing force to magnetizing force on the driving core and $q$ the same ratio on the driven selected core, it can be shown that $$p\cdot q=\frac{1}{2}\,\frac{ra}{RA}$$

where $r$ and R and $a$ and A are the radii and cross-sections of the driven and driving cores respectively. In other words, the ratio of volumes of the driving and driven cores must be large. A ratio of volume of 50 will make it possible to have detrimental reactions of only 10%. A ratio of volumes of 50 means a ratio of linear dimensions of $\sqrt[3]{50}\approx 3.7$. Of course the number of turns on the driving and driven cores must be properly adjusted in order that $p=q$, which occurs when $$\left(\frac{N}{n}\right)^2=2\frac{aR}{Ar}$$

The choice of the absolute number of turns determines the value of the series resistance required.

The use of two driving matrices has made it possible to switch to $n^2$ cores with $4\sqrt{n}$ input channels (or $8\sqrt{n}$ electronic devices since a factor of 2 arises from the single polarity character of such devices). Of course $8\sqrt{n}$ is smaller than $4n$ for $n$ is greater than 4.

The advantage due to the use of one step of driving matrices can be compounded by the use of several such steps. Referring to Fig. 4, there may be seen a central main array of magnetic cores 10 driven by two highest order driver arrays of magnetic cores 30, 32. Each of these highest order driver arrays of magnetic cores 30, 32 is respectively driven by the two next highest order driver arrays of magnetic cores 60, 70, 62, 72. To avoid both undue complexity in the drawing and because of the loss of detail which would occur if the toroidal cores 10, as well as row coils 24, column coils 22 and associated coil resistors 23, 25 and reading coil 16 were drawn, these elements have been omitted from the main array which is represented instead by circles tangent to which lines are drawn denoting coupling to the row and column driver arrays. It is to be noted that each array which is driven has a row and column driver array of lower order associated therewith. Each of the coils coupling an element in a driver array to the respective row or column of the array being driven has in series with that coil a resistor 35, 39, 63, 73 for the purpose of minimizing the effect of any induced current which is a result of the element being driven changing its condition. More specifically, for the arrangement shown in Figure 4, there are four lowest order driver arrays of equal rank (of four elements each). Two lowest order driver arrays consisting of magnetic elements 60 and 70, respectively serve as a column and row driver array for the next higher order array, which, in this instance, is the row driver array for the main array and has magnetic elements 30. The two lowest order column and row arrays driving the row driver array for the main array have their elements 60, 70 respectively coupled to all the elements 30 in columns by column coils 38, each of which has a series of resistor 39, and to all the elements 30 in rows by row coils 36, each of which has a series resistor 35.

Inputs to the lowest order arrays are made in binary fashion. All the elements 60 in each column in the lowest order driver array are coupled to a column input coil 58, and the elements 60 in each row are coupled to a row input coil 56. All the elements 70 in each column in the lowest order driver array are coupled to a column coil 48, and all the elements 70 in each row are coupled to a row coil 46.

Similarly, two lowest order driver arrays of equal rank and consisting of magnetic elements 62 and 72 respectively serve as a row and column driver array for the next higher order array, which, in this instance, is the column driver array for the main array and has magnetic elements 32. These two lowest order column and row arrays have their elements 62, 72 respectively coupled to all the elements 32 in rows by row coils 40, each of which has a series resistor 63, and by column coils 42, each of which has a series resistor 73. Inputs to these two lowest order arrays are made in binary fashion. All the elements 62 in each column of this lowest order array are coupled to a column input coil 52 and the elements 62 in each row of the lowest order array are coupled to a row input coil 52. All the elements 72 in each column of this lowest order array are coupled to a column input coil 74, and all the elements 72 in each row are coupled to a row input coil 76.

The scheduling of pulses used for driving the main matrix in the system shown in Figure 4 is the same as that shown previously in Table I. The inputs to the lowest order arrays which drive the highest order row driver array are the matrix $y$ inputs, the inputs to the lowest order arrays which drive the highest order column driver array are the matrix $x$ inputs. Pulses are applied to a row input coil 46, 56 and to a column input coil 48, 58 to drive a magnet element 60, 70 in each of the two lowest order $y$ arrays. The currents, resulting in a row and in a column driver coil 36, 38, which are coupled to the two elements 60, 70 selected, combine to drive the element 30 to which both coils are coupled. Similarly, pulses are applied to a row input coil 50, 76 and to a column input coil 52, 74 to drive a magnetic element 62, 72 in each of the two lowest order $x$ arrays. The currents, resulting in a row and in a column driver coil 40, 42, which are coupled to the two elements 62, 72 selected, combine to drive the element 32 to which both coils are coupled. By driving an element 30, 32 in each of the highest order driver arrays, a current is induced in the row and column driver coils 24, 22 coupled to those highest order arrays, thereby driving an element 10 in the main array coupled to both coils.

It is to be noted that the volume of the material in the elements in the lowest order driver arrays is largest and the volume of the material in the elements diminishes as the order of the array increases. The reason for this is to obtain a greater driving force for turning over the subsequent cores.

In Figure 4 there is represented a magnetic switching system wherein four two-by-two matrices drive two four-by-four matrices which drive the main matrix of 16 x 16 elements. It is seen that with the use of two transformer steps it is possible to switch from purely binary inputs into 256 storing cores.

Fig. 5 illustrates the effect of employing three driving steps where any one of 65,536 storing cores can be selected employing a purely binary address excitation. The number of cores in a next step would be approximately four billions, so that no more than four successive steps of driving cores are necessary to reach any practical desired limit. Each rectangle in Figure 5 represents a magnetic array with the number of elements in the array shown in the rectangle. The arrows in each rectangle indicate the array to which it is inductively coupled, in the manner previously expained, for driving said array.

Table II illustrates the number of cores and matrices which may be controlled cumulatively.

TABLE II

*Number of cores and matrices by the cumulative use of driving matrices*

| Bits (binary positions) | 2 | 4 | 8 | 16 | 32 |
|---|---|---|---|---|---|
| First Matrix: | | | | | |
| number of cores | 4 | 4 | 4 | 4 | 4 |
| number of matrices | 1 | 2 | 4 | 8 | 16 |
| Second Matrice: | | | | | |
| number of cores | ---- | 16 | 16 | 16 | 16 |
| number of matrices | ---- | 1 | 2 | 4 | 8 |
| Third Matrix: | | | | | |
| number of cores | ---- | ------ | 256 | 256 | 256 |
| number of matrices | ---- | ------ | 1 | 2 | 4 |
| Fourth Matrix: | | | | | |
| number of cores | ---- | ------ | -------- | 65, 536 | 65, 536 |
| number of matrices | ---- | ------ | -------- | 1 | 2 |
| Fifth Matrix: | | | | | |
| number of cores | ---- | ------ | -------- | -------- | $2^{32} \cong 4.29 \times 10^9$ |
| number of matrices | ---- | ------ | -------- | -------- | 1 |

The examples shown in Table II are by no means exhaustive. For example, the number of cores in the final matrix need not be a power of two whose exponent is itself a power of two (such as 32). If one were to start with matrices 8 $\times$ 8, the next step would be 64 $\times$ 64, and the next 4,096 $\times$ 4,096=16,777,216, exceeding 16 million cores. That number is, of course, $2^{24}$. Twenty-four is not a power of two. In this example, three transformation steps yield more than 16 million cores. Also, the matrices need not be square but can be rectangular such as 8 $\times$ 16, or 64 $\times$ 256.

It is also obvious that the number of cores in the matrices need not be powers of two at all. For example, two matrices 10 $\times$ 10 can drive a matrix 100 $\times$ 100, and compounding can be done in the decimal system, the next step yielding $10^8$ cores. Since the binary system is most economical when purely bivalued signals are used, the binary system will be assumed in the further descriptions herein.

The schedule of pulses as shown in Table I for the two matrices-driving-a-matrix is also applicable to the cumulative matrices exemplified in Figures 4 and 5. The direction of excitations tabulated under column driver matrix and under row driver matrix apply respectively to all the binary positions of the lowest order driver matrices culminating in the highest order column driver matrix and the lowest order driver matrices culminating in the highest order row driver matrix. For simplicity of reference the lowest order matrices which drive the highest order row driver array are designated as the $y$ matrices having a $y$ input. The lowest order matrices which drive the highest order column driver array are designated as the $x$ array having an $x$ input. As shown in Figure 5, there are 8 binary positions for $x$ and 8 binary positions for $y$. By selectively exciting those in $x$ (or $y$) in direct P or N, a particular core in each of the two 256-element matrices is selected. This applies excitation to a particular row and/or column coil in the main matrix of 65,536 cores. By scheduling the application of excitation to all 8 positions in "$x$" and to all the 8 positions in "$y$," either simultaneously to the $x$ and $y$ positions or first to the $x$ positions and then to the $y$ positions, as shown by the schedule of Table I, determination of the condition of any core in the main driven array may be made.

The driving of the input matrices can be done by ordinary vacuum tubes. The choice of the polarity or magnetization on the input cores may require two tubes driving any one core, for magnetizing it in one direction and the other in the other, as was mentioned before. This is due to the unidirectional nature of the electron flow in ordinary vacuum tubes.

Referring now to Fig. 6, there may be seen a circuit diagram of a 4 $\times$ 4 matrix 100 being driven by two 2 $\times$ 2 matrices 102, 104. Driving the lowest order magnetic matrices are electron discharge tubes. A pair of tubes 106A, 106B, 108A, 108B is associated with each element in the lowest order magnetic driver arrays 102, 104. Each tube has a plate load consisting of two windings in series 110A, 110B, 112A, 112B, 114A, 114B, 116A, 116B. Each of these windings is wound around an adjacent toroidal element in the lowest order magnetic driver array. The windings are so arranged that current drawn by one tube 106A, 108Aof a pair through its winding 110A, 112A, 114A, 116A sets up a magnetic field, in the element associated therewith, which is in opposition to the field established when current is drawn by the other tube 106B, 108B of the pair through its winding 110B, 112B, 114B, 116B. Each pair of tubes 106A, 106B, 108A, 108B, have their control grid connected alternately to two common busses 120, 122 for polarity determination. The screen grids of each pair of tubes are connected together and brought out to address input terminals 124, 126. Address, in accordance with a binary input, is determined by applying binary push-pull signals to the address terminals to permit two pairs of tubes for a row and two pairs of tubes for a column to become conductive. The choice of polarity to which the elements are to be driven is determined by the signals applied to the control grids of the row and column selected pair of tubes. Accordingly, for each binary position only one of the four tubes selected will conduct. This is the one of the selected pairs of tubes which receives a signal from the P or N bus 120 or 122. It should be noted that excitation from two tubes is required to drive an element to P or N. Thus selection is made of a single magnetic core in the row driver array 102 and in the column driver array 104 by which in turn selection is made of a desired element in the main array 100.. The electron tubes 106, 108 are used herein to drive the first matrices in a cumulative system of matrices. There are required $4n$ tubes for $2^n$ storing elements. This is a considerable improvement over the $4n$ tubes required in a non-cumulative system in which only $n^2$ storing elements are driven. Furthermore, this is done with a radix $n$-address rather than one in the binary system.

There is a method for reducing the number of driving tubes by nearly a factor of two. It is based on the fact that all the driving matrices (not in the main matrix) can be only in two states: Either all the cores are at N, or one selected core is at P while all others are at N. This can be verified by following the schedule of Table I. Consequently the cores of the lowest order matrix need not be provided with selective windings for magnetizing selectively in both directions. Selective windings for P are necessary, but for direction N a non-selective winding driving all the cores of the matrix to N is sufficient. Indeed, by applying a current pulse of sufficient amplitude to this common winding, all the cores will be magnetized in direction N, and by applying current pulses to the selective windings in direction P, any core can be selectively magnetized in direction P.

Figure 7 illustrates a circuit arrangement for this case. There is shown a matrix 130 of 16 elements driven by a lower order row and column driver magnetic matrix 132, 134 each of which in turn is driven by two pairs of tubes 136A, 136B, 138A, 138B. Each of the tubes have two windings 140A, 140B, 142A, 142B, 144A, 144B, 146A, 146B in its plate load, each of which is inductively coupled to an adjacent driver element. The two windings wound on a single magnetic element from two tubes are wound on the element so that both tubes must be conducting in order to drive the element. The windings from the tubes 136A, 136B, 138A, 138B are only required to drive the element to P. A common N restoring winding 150 is wound on all the elements and is driven by a single tube 152. Of course, all the lowest order driving matrices corresponding to the rows of the main matrix, designated heretofore as $y$, and those corresponding to the columns, designated heretofore as $x$, must have separate common N-driving restoring windings, since the N magnetization must be made successive rather than simultaneous in some cases. The arrangement shown in Fig. 7 is for a lowest order matrix of either the $x$ or $y$ type. Consequently, if the main matrix has $2^n$ elements $2n+2$ tubes are required for driving it. This is almost the minimum possible. For a main matrix of 256 elements, 18 tubes are required, and one of 65,536 elements, 34 tubes are required. It will be seen that, where $x$ and $y$ driving matrices are involved, there are two "common N" restoring windings. A single tube is connected to each of these windings and both are driven simultaneously by a signal when it is desired to write N into the matrix. These tubes are driven sequentially by signals when it is desired to return the driver matrices to their normal condition without affecting what is written in the main matrix.

Referring to Fig. 8, there may be seen in schematic form the control possibilities obtainable with cumulative matrices. The matrices are each represented by rectangles. The main matrix is an array of 256×256 elements and it is driven cumulatively by row and column driver matrices, the lowest order of which have 2×2 elements. The arrows represent the direction of drive. A single "N restoring" driver is used for the row matrices and a single "N restoring" driver is used for the column matrices. Accordingly, selection of an element in the main matrix is made by selecting a row and column coil in each one of the lowest order driver rows which culminate in the desired element in the main array. Selection of 16 out of 32 possible coils therefore controls a matrix having 65,536 elements which, without the driver array system would entail a selection of two out of 512 coils. For restoration, the common N winding restoring scheme is utilized. The cumulative row driver elements may be restored successively or simultaneously with the restoration of the cumulative column driver elements, depending upon whether or not it is desired to leave the condition of the selected element in the main matrix in its condition prior to writing or reading.

In general, in a memory device for computing or information handling machines, or any purpose of storage, it is desired to store, under a given address, an entire "word" composed of many bivalued signals, and not merely one signal, as is the case of the cumulative matrix system described so far. Obviously, to achieve this, as many entire systems as described heretofore can be used in parallel, the same address being chosen in each, with the selected core in the final matrices being set to N or P according to the "word" being stored. There is a way of achieving this without duplicating all the driving matrices for each digit of the word.

Reference is made to the article by Jay W. Forrester, which is identified above herein, for a three-dimensional arrangement for storing of a single bit. A brief description of the method of achieving such storage consists of having a set of matrices in parallel which are excited in the x—y coordinates so that the same core is reached in all. In addition, each core has a third winding connected in series throughout any one set of cores in any $x$—$y$ plane. An inhibiting current pulse of the same amplitude but opposite direction as the exciting current pulse is sent through all of these common windings except the particular set in which the storage is desired. In the selected set of cores, the selected core receives two units of magnetization (1+1), the unselected one on the selected rows and columns receives one unit of magnetization and the other none. In the unselected set of cores, the selected core receives one unit of current (1+1—1), the unselected core on the selected row or column receives zero units (1—1) and the others receive a negative unit (—1). It is clear, therefore, that only the selected core in the selected set receives the two units of current required to change its state of magnetization. This trick utilizes the full range of magnetizing field H, between negative and positive coercive force, rather than just half that interval.

Referring to Fig. 9, there is shown a schematic diagram of a system wherein a parallel array of main or driven matrices 160 are driven by a set of cumulative column driver matrices 162 and a set of cumulative row driver matrices 164. The matrix arrays are each represented by a rectangle having inscribed thereon the number of elements or magnetic toroids in the array. Each one of the main arrays 160 has associated therewith an inhibiting winding represented by lead 168 which, in accordance with the article by Forrester, is common to all the cores which are aligned in a "*z*" plane. The driver arrays have a common N restoring winding. The highest order array of the cumulative row driver arrays has each of its elements connected to a different row. Each of the corresponding rows in the main array is connected in parallel, as represented by leads 170, 172. Therefore, excitation may be applied simultaneously to all the rows in all the arrays which are connected to a single element in the row driver highest order array. The columns' highest order array likewise is inductively coupled to the columns in each one of the main driven arrays.

Consider now, one matrix of a set of matrices driven by cumulative matrices, as shown in Figure 9. Let us assume that the cores of the matrix have each a winding connected in series throughout, such as the reading winding. Now let the row and column driving matrices go to P simultaneously, by applying selective current pulses to the input binary matrices, as in Figs. 7 and 8. Then the selected core of the main matrix will go to P. However, if an inhibiting pulse is applied to a common winding in any one of the matrices in the direction N, no core will change. Similarly, when the driving matrices are simultaneously driven to N by the restoring pulses on the common windings, the selected core of the main matrices are driven towards N. If an inhibiting pulse in direction P is applied to the common winding of the main matrix, this effect will be cancelled and no core will be affected. Consequently, a simple schedule of driving for the cumulatively-matrix driven matrix can be used as follows:

TABLE III

*Schedule of exctiations using inhibiting pulse on main matrix*

| Steps | Driving Matrices | Inhibiting Pulse, Main Matrix or matrices | State of Selected Core In Main Matrix or matrices |
|---|---|---|---|
| To Write: | | | |
| Step 1 | Selected positions to P. | None | P |
| Step 2—Pos | Restore all to N | In direction P. | P |
| Step 2—Neg | Restore all to N | None | N |
| To Read: | | | |
| Step 1 | Selected positions to P. | None | P |
| Step 2, if no signal, step 1. | Restore all to N | In direction P. | P |
| Step 2, if signal, step 1. | Restore all to N | None | N |

It is seen that the writing and reading require only two steps with this method, rather than the three steps required by the previous restoration to N method by successive steps for rows and columns. Also the writing and reading steps are identical. The nature of the second step is determined for writing by the desired input and for reading by the findings in the first step. This system leads, therefore, to a shorter access time.

Now consider the case of the simultaneous storage of a word or set of bivalued signals under the same address. There will be a set of main matrices 160 in each of which it is desired to select similarly addressed cores simultaneously and to set each such core into the desired direction of magnetization according to the signals composing the word. To accomplish this let there be only one set of driving matrices 162, 164. The highest order of the driving matrices will be coupled to a set of main matrices 160. This coupling can be either by several separate secondary windings on the cores of the highest driving matrix, or by putting all the identical rows of all main matrices in series and all the columns of all main matrices in series, and coupling them respectively to single secondary windings on the cores of the highest driving matrices. This is represented by the lines 174, 176 from the row and column driver matrices 162, 164. On each of the main matrices let there be a common winding 168, i. e., a winding on all cores connected in series (this can be the reading winding). This is represented by a double-ended arrow going to each of the rectangles of the main matrices. Now let the driving matrices go through the steps 1 and 2 of the schedule of Table III. Let the inhibiting pulse to the main matrices be individually controlled by the corresponding bivalued signals of the word, or the corresponding individual responses to step 1. The input control is represented by the small rectangles 180 marked "in." Output as a result of reading is detected by a circuit represented by a small rectangle 182 marked "out." This may be a unistable state trigger circuit which is driven to its unstable state when there is an output pulse. It is clear that in this manner all the input "information" signals (let us say M such signals) can be stored and read off simultaneously in two steps. Should there be $2^n$ elements in the main matrices, or $M2^n$ bits of total storage capacity, the required number of tubes for input switching is:

$$2n+1+M$$

the $2n$ corresponding to the $n$ push-pull inputs, the one to the common N restoring driving matrices pulse, and the M to the set of inhibiting windings fo the main matrices. For reading, auxiliary storage units of the result of reading are also required. If conventional flip-flops are used this requires 2M tubes, but if some delay trick is used, only M tubes, or no tubes at all, may be required.

In Figure 9 is illustrated a system of 7 matrices with 65,536 elements each or a total of 458,752 elements. It requires in all $2\times16+1+7=40$ tubes, exclusive of the reading flip-flops (7 tubes). It will be noted that this system of switching, by cumulative matrices common to a set of parallel information holding matrices, is very economical in the number of driving tubes. In fact, the number of tubes is practically the minimum possible, since there is only one pair of tubes for each position of the push-pull binary address, and only one (or two) tubes in each channel of information.

An important advantage of the cumulative switching matrices is one of impedance matching. The final information holding matrix should be composed of very small cores. In fact, the smaller the cores, the less the energy stored and the greater the ratio of information capacity to driving energy. With very small cores it is difficult to have many turns in the windings. Since the required number of turns (for a given current) is proportional to the diameter of the core while the ratio area of the opening to the square of the diameter becomes smaller, it becomes difficult to use many turns. Therefore, a high current must be used. The voltage swing across a few (even only one) turns is very small, so that the driving device has to work into what is essentially a low impedance, i. e., large current and small voltage swing. Since vacuum tubes are relatively high impedance devices, there is a mismatch. The driving matrices really amount to transformer driving. As the cores become proportionately larger in the lower order matrices, it is convenient to use more turns and consequently to obtain a good impedance matching with the vacuum tube driver.

Another advantage is obtained by the use of the transformer driving of the matrices. It will be remembered that the selection of the desired core depends on the fact that it has twice the exciting current existing in the core of next nearest excitation. If the hysteresis loop is perfectly rectangular, this discrimination is completely sufficient and absolutely no effect is produced on the cores other than the selected one. However, with most available materials, the hysteresis loop is not perfectly rectangular and a slight effect on the non-selected cores is observed, as was pointed out before. The driving windings of any row or column are coupled through a resistance to the secondary of a driving core. Since that driving core is saturated, the winding presents practically zero impedance, so that the unselected cores which are subjected to half the excitation of the selected core are coupled to a resistive load. This load tends to prevent any change of flux from occurring. In other words, currents opposing the undesired change of flux are induced through the undesired change of flux itself. This effect helps especially in decreasing the unwanted changes of flux.

The arrangement of magnetic elements in the main driven arrays and in the successive driver arrays are referred to as arrays and shown in the regular row and column order for the purpose of convenience in explanation and illustration. This, however, should not be construed as a limitation of the arrangement of the elements in a matrix, since it will be appreciated that the principles described herein are applicable to arrangements other than a regular row and column array.

What is claimed is:

1. A system for selectively determining the polarity of magnetization of any one of a plurality of magnetic elements disposed in columns and rows in a driven array comprising two driver arrays each having a plurality of magnetic elements, means to inductively couple each of the elements in one of said driver arrays to all of the elements in different columns of said driven array, means to inductively couple each of the elements in the other of said driver arrays to all of the elements in different rows of said driven array, and means to selectively change the polarity of magnetization of a desired one of the elements in each of said driver arrays whereby there may be effectuated a change in the polarity of magnetization of an element which is in said driven array at the intersection of the column and row of elements inductively coupled to said desired ones of the elements in said driven arrays.

2. A system as recited in claim 1 wherein said means to selectively change the polarity of a desired one of the elements in each of said driver arrays includes additional sets of driver arrays cumulatively driving each of said two driver arrays, each of the arrays in said additional sets of driver arrays having a lesser number of elements than a driver array which is immediately driven by it, each of the elements of said additional sets of driver arrays being inductively coupled to the elements of an immediately driven driver array in the same manner as said two cumulatively driven driver arrays are coupled to said driven arrays.

3. A system for selectively determining the polarity of magnetization of a magnetic element in a main driven array of a plurality of magnetic elements disposed in columns and rows and having a means to indicate the magnetic condition of any one of said elements, comprising a column driver array and a row driver array of magnetic elements, means to inductively couple each of the elements in said column driver array to all the elements in a different column of said driven array, means to couple each of the elements in said row driver array to all of the elements in a different row of said driven array, a separate coil means associated with each row of elements in each of said row and column driver arrays, each of said coil means being inductively coupled to all of the elements in its associated row, a separate coil means associated with each column of elements in each of said row and column driver arrays, each of said coil means being inductively coupled to all of the elements in its associated column, means to apply to one of said row associated coil means and to one of said column associated coil means in said row driver array and in said column driver array currents sufficient to change the polarity of magnetization of the respective elements at the intersection of the row and column in the respective row and column driver arrays with which said excited coil means are associated to change the polarity of magnetization of an element in said main driven array which is inductively coupled to the two elements in said driver arrays which have their polarity of magnetization changed.

4. A system as recited in claim 3 wherein said means to apply currents to one of said row associated coil means and to one of said column associated coil means in said row driver array and in said column driver array includes a separate row array of elements and a separate column array of elements for said row driver array and said column driver array, said separate row and column arrays being respectively inductively coupled to said row driver array and column driver array in similar fashion to the coupling of said row driver and column driver arrays to said driven array.

5. A system as recited in claim 4 where said magnetic elements in all said arrays are toroidal in shape and the volume of said toroidal elements is smallest in said driven array, is larger in said driver arrays and is still larger in said separate arrays.

6. A system as recited in claim 5 wherein each of said means to inductively couple the elements in a row or column driver array to all the elements in a row or column in a succeeding array being driven includes a resistor in series with a closed coil having a number of turns wound around the ring of said toroid driver element and a number of turns wound around the ring of each toroid element being driven.

7. A system for determining the polarity of magnetization of one of a plurality of magnetic elements disposed in columns and rows in a main driven array comprising a plurality of driver arrays of magnetic elements arranged as successive row and column driver arrays for succeeding ones of said plurality of arrays being driven, said plurality of driver arrays culminating in a row driver and a column driver array for said main driven array, a means for each of the elements in each of said row driver arrays to inductively couple said each element to all of the elements in a row in a succeeding array being driven, a means for each of the elements in said column driver arrays to inductively couple said last named each element to all of the elements in a column in a succeeding array being driven, means to change the polarity of magnetization of a selected one element in each of the lowest order row and column driver arrays of said successively arranged arrays whereby there is effectuated a change in the polarity of magnetization of an element in each of the succeeding arrays which are at the intersection of the row and column coupled to the elements whose polarity of magnetization is changed responsive to the change in the selected elements.

8. A magnetic matrix memory system comprising in combination a main driven array of a plurality of magnetic elements, and means to drive said main driven array including a plurality of driver arrays of magnetic elements successively arranged in ascending order as row and column driver arrays for succeeding arrays being driven, which in turn serve as row or column driver arrays for succeeding arrays being driven, said driver arrays cumulating in a row and a column driver array for said main driven array, a means for each of the magnetic elements in a row driver array to inductively couple said element to all the elements in a different row in a succeeding array being driven, a means for each of the magnetic elements in a column driver array to inductively couple said element to all of the elements in a different column in a succeeding array being driven, means to simultaneously change the polarity of magnetization of a selected one element in each of the lowest order row and column driver arrays of said successively arranged arrays whereby a change in the polarity of magnetization of the elements in the successive arrays which are inductively coupled to an element in a row and to an element in a driver array whose polarity of magnetization is changed thereby occurs, cumulatively resulting in a magnetomotive force being applied to a desired one of the magnetic elements in said main driven array sufficient to change its polarity of magnetization if in condition to be changed.

9. A system as recited in claim 8 wherein said magnetic elements in all said arrays are toroidal in shape and the volume of said toroidal elements is largest in said outermost driver arrays and gradually diminishes with said succeeding driver arrays and is smallest in said main driven array.

10. A system as recited in claim 9 wherein each of said means for each of the elements in a row or column driver array to inductively couple to all the elements in a row or column in a succeeding array being driven includes a resistor in series with a closed coil having a number of turns wound around one side of said toroid driver element and a number of turns wound around one side of each toroid element being driven.

11. A magnetic matrix memory system comprising in combination a main driven array of a plurality of magnetic elements having a means to indicate the magnetic condition of any one of said elements, and means to drive said main driven array including a column driver array of magnetic elements and a row driver array of magnetic elements, means to inductively couple each of the elements of said column driver array to all the elements in each column of said driven array, means to couple each of the elements in said row driver array to all of the elements in each row of said driven array, a separate row coil associated with each row of elements in each of said row and column driver arrays, each row coil being inductively coupled to all the elements in the row with which it is associated, a separate column coil associated with each column of elements in each of said row and column driver arrays, each of said column coils being coupled to all of the elements in its associated column, means to apply to one of said row coils and to one of said column coils both in said row driver array and in said column driver array currents sufficient to change the polarity of magnetization of the respective elements coupled to an excited row and column coil in the respective row and column driver arrays whereby an element which is at the intersection of the row and column of elements coupled to the elements in the row and column driver array which have their polarity of magnetization changed may have its polarity of magnetization changed.

12. A system as recited in claim 11 wherein said means to apply currents to one of said row associated coil means and one of said column associated coil means in said row driver array and said column driver array includes a separate row array of elements and a separate column array of elements for said row driver array and said column driver array, said separate row and column arrays being respectively inductively coupled to said row driver array and column driver array in similar fashion to the coupling of said row driver and column driver arrays to said driven array.

13. A magnetic switching system comprising a plurality of arrays of magnetic elements, said arrays being arranged in ascending order from a plurality of lowest order arrays to a highest order array, two lower order arrays being associated with and driving a higher order array, the number of magnetic elements in each of said lower order arrays being equal to the number of columns and rows of elements in the associated higher order array, first coil means coupling each of the elements of one of each two lower order arrays with all the elements in a different one of the columns of the associated higher order array, second coil means coupling each of the elements in the other of said two lower order arrays with all of the elements in different ones of the rows of said associated higher order array, a plurality of means to selectively change the polarity of magnetization of one element in each of said lowest order arrays, means to operate said plurality of means simultaneously to change the polarity of magnetization of an element in a higher order array coupled to two elements in each of the associated lower order arrays whose polarity is changed responsive to said simultaneous operation, and means to operate certain ones of said plurality of means in succession to the operation of the remaining ones of said plurality of means to restore the original polarity of magnetization to all elements but the element driven in said highest order array.

14. A magnetic switching system as recited in claim 13 wherein said plurality of means to selectively change the polarity of magnetization of one element in each of said lowest order arrays includes a pair of electron discharge tubes for each row and each column in each of said lowest order arrays, each of said tubes having an anode, a cathode, and at least two control grids, coil means to couple each of said pair of electron tubes in push-pull fashion to all of the elements in an associated column or row, means to selectively apply a first set of address signals to one of the control grids in each of said pairs of tubes to determine which of said pairs of tubes is to be rendered conductive, and means to apply polarity signals to the other grid in each of said pair of tubes to determine which one of each of said pairs of tubes selected by said address signals is to conduct whereby address and polarity of a magnetic element in said main driven matrix is determinable.

15. A magnetic matrix memory system comprising in combination a main driven array of a plurality of magnetic elements, means to indicate a change in the magnetic condition of any one of said elements, and means to drive said main driven array including a plurality of driver arrays of magnetic elements successively arranged in ascending order as row and column driver arrays for successive arrays being driven which in turn serve as row and column arrays for succeeding arrays being driven, said plurality of driver arrays cumulating in a highest order row and column driver array for said main driven array, a means for each of the magnetic elements in a row driver array to inductively couple said element to all the elements in a different row in a succeeding array being driven, a means for each of the magnetic elements in a column driver array to inductively couple said element to all of the elements in a different column in a succeeding array being driven, means to simultaneously restore the polarity of magnetization of said selected one element in each of the lowest order driver arrays which cumulate in said row driver array for said main array, means to simultaneously restore the polarity of magnetization of said selected one element in each of the lowest order driver arrays which cumulate in said column driver array for said main array, and means to control both said last named means to operate simultaneously to leave the desired element in said main array with the initial polarity of magnetization and to operate in sequence to leave the desired element in said main array with a changed polarity of magnetization.

16. A magnetic matrix memory system comprising in combination a main driven array of a plurality of magnetic elements, means to indicate a change in the magnetic condition of any one of said elements, and means to drive said main driven array including a plurality of driver arrays of magnetic elements successively arranged in ascending order, row and column driver arrays for successive arrays being driven which in turn serve as row and column arrays for succeeding arrays being driven, said plurality of driver arrays cumulating in a row and column driver array for said main driven array, a means for each of the magnetic elements in a row driver array to inductively couple said element to all the elements in a different row in a succeeding array being driven, a means for each of the magnetic elements in a column driver array to inductively couple said element to all of the elements in a different column in a succeeding array being driven, means to simultaneously restore the polarity of magnetization of all the elements in all of the lowest order driver arrays which cumulate in said row driver array for said main array, means to simultaneously restore the polarity of magnetization of all the elements in all of the lowest order driver arrays which cumulate in said column driver array for said main array, and means to control both said last named means to operate simultaneously to leave the desired element in said main array with its initial polarity of magnetization and to operate in sequence to leave the desired element in said main array with its changed polarity of magnetization.

17. A magnetic matrix system as recited in claim 16 having in addition a means, responsive to a change in polarity of an element in said main driven array in response to a given change in polarity of magnetization of said selected elements in said lowest order arrays, to operate simultaneously both said means to simultaneously restore the polarity of magnetization of the elements in said lowest order column and row driver arrays.

18. A magnetic switching system comprising in combination a plurality of main driven arrays each array consisting of a plurality of magnetic elements, a row driver array of magnetic elements, a column driver array of magnetic elements, a first coil means for each of the elements in said row driver array coupling said element to all of the elements in a different row in each of said plurality of main driven arrays, a second coil means for each of the elements in said column driver array coupling said element to all of the elements in a different column in each of said plurality of main driven arrays, means to change the polarity of magnetization of a selected one element in said row driver array, means to change the polarity of magnetization of a selected one element in said column driver array, means to operate both said polarity of magnetization changing means simultaneously, means to operate both said polarity changing means in sequence, whereby a simultaneous operation of said polarity changing means results in the application of a magnetomotive force to each of the magnetic elements in each of said main driven arrays which are coupled to both said selected elements, said magnetomotive force having a sufficient amplitude to change the polarity of magnetization of each of said elements when in condition to be changed, and means to selectively apply an inhibiting magnetomotive force to desired ones of said main driven array elements to inhibit said elements from being affected by the magnetomotive force applied from said selected row and driver elements.

19. A magnetic switching system comprising in combination a plurality of main driven arrays each array consisting of a plurality of magnetic elements, a plurality of driver arrays of magnetic elements arranged as successive row and column driver arrays for successive driver arrays being driven, said successive arrays cumulating in a row and a column driver array for said main driven array, a means for each of the elements in said cumulative row driver array to inductively couple said element to all of the elements in a different row in each of said plurality of main driven arrays, a means for each of the elements in said cumulative driver array to inductively couple said element to all of the elements in a different row in each of said plurality of main driven arrays, a means for each of the elements in a row driver array to inductively couple said element to all of the elements in a different row in a succeeding driver array being driven, a means for each of the magnetic elements in a column driver array to inductively couple said element to all of the elements to a different column in a succeeding driver array being driven, means to simultaneously change the polarity of magnetization of a selected one element in each of the lowest order row and column driver arrays of said successively arranged arrays whereby a change in the polarity of the elements in the successive arrays which are at the intersections of the rows and columns inductively coupled to said selected elements occurs cumulatively resulting in the application of a magnetomotive force to a desired one of the magnetic elements in each of said main driven arrays sufficient to change its polarity of magnetization when in condition to be changed, and means to selectively apply an inhibiting magnetomotive force to selected ones of said desired ones of said magnetic elements to inhibit them from being affected by the magnetomotive force applied from said driver arrays.

20. A magnetic switching system as recited in claim 8 wherein all the magnetic elements in said main driven array and said driver arrays are toroidal in shape, the volume of the toroidal elements in said lowest order arrays is a maximum and progressively decreases in each higher order array, and said means to inductively couple the elements in a row or column driver array to all the elements in a row or column in a succeeding array being driven includes a resistor in series with a closed coil having a number of turns wound around the ring of said toroid driver element and a number of turns wound around the ring of each toroid element.

21. A system for selectively determining the polarity of magnetization of any one of a plurality of driven magnetic elements individually identifiable as corresponding to the elements of a matrix arranged in rows and columns comprising two driver groups each of a plurality of magnetic driver elements, means to couple inductively each of the elements in one of said driver groups to all of said driven magnetic elements which correspond to the elements of a different column of said matrix, means to couple inductively each of the said elements in the other of said driver groups to all of said driven magnetic elements which correspond to the elements of a different row of said matrix, and means selectively to change the polarity of magnetization of a desired one element in each of said driver groups whereby there may be effectuated a change in the polarity of magnetization by current coincidence of a driven magnetic element corresponding to the matrix element at the intersection of that column and row of said matrix to the corresponding driven magnetic elements of which said desired ones of said driver groups are coupled.

22. A system as claimed in claim 21, the magnetic elements of said driver groups each having a greater volume than any single said driven magnetic element.

23. A system for selectively determining the polarity of magnetization of any one of a plurality of driven magnetic elements individually identifiable as corresponding to the elements of a matrix arranged in rows and columns comprising two driver groups each of a plurality of magnetic driver elements, means to couple indictively each of the elements in one of said driver groups to all of said driven magnetic elements which correspond to the elements of a different column of said matrix, means to couple inductively each of the said elements in the other of said driver groups to all of said driven magnetic elements which correspond to the elements of a different row of said matrix, means to apply simultaneously a magnetomotive force to drive to one polarity of magnetization a selected element of said one driver group and a selected element of said other driver group, thereby to apply by the inductive couplings magnetomotive force of one polarity to a selected driven magnetic element to drive said selected driven element to saturation in said one polarity, and means to apply in sequence a magnetomotive force to said selected driver elements in said driver groups to restore in sequence said selected driver group elements to their initial polarity of magnetization and to leave said selected driven magnetic element in said one polarity of magnetization.

24. A system for selectively determining the polarity of magnetization of any one of a plurality of driven magnetic elements individually identifiable as corresponding to the elements of a matrix arranged in rows and columns comprising two driver groups each of a plurality of magnetic driver elements, means to couple inductively each of the elements in one of said driver groups to all of said driven magnetic elements which correspond to the elements of a different column of said matrix, means to couple inductively each of the said elements in the other of said driver groups to all of said driven magnetic elements which correspond to the elements of a different row of said matrix, means to apply simultaneously a magnetomotive force to drive to one polarity of magnetization a selected element of said one driver group and a selected element of said other driver group, thereby to apply by the inductive couplings magnetomotive force of one polarity to a selected driven magnetic element to drive said selected driven element to saturation in said one polarity, and means to apply simultaneously a magnetomotive force to said selected driver elements in said driver groups to restore simultaneously said selected driver group elements to their initial polarity of magnetization and to drive said selected driven magnetic element to said other polarity of magnetization.

25. A system for selectively determining the polarity of magnetization of any one of a plurality of driven magnetic elements individually identifiable as corresponding to the elements of a matrix arranged in rows and columns comprising two driver groups each of a plurality of magnetic driver elements, means to couple inductively each of the elements in one of said driver groups to all of said driven magnetic elements which correspond to the elements of a different column of said matrix, means to couple inductively each of the said elements in the other of said driver groups to all of said driven magnetic elements which correspond to the elements of a different row of said matrix, means to apply simultaneously a magnetomotive force to said selected driver elements in said driver groups to restore simultaneously said selected driver group elements to their initial polarity of magnetization and to drive said selected driven magnetic element to said other polarity of magnetization, and means selectively to apply a magnetomotive force to said selected driver elements to restore said selected driver elements to their initial polarity of magnetization in one of the following two ways: (1) in sequence, to leave said selected driven magnetic element in said one polarity of magnetization, and (2) simultaneously, to drive said selected driven magnetic element to said other polarity of magnetization.

26. A system for selectively determining the polarity of magnetization of any one of a plurality of driven magnetic elements individually identifiable as corresponding to the elements of a matrix arranged in rows and columns comprising two driver groups each of a plurality of magnetic driver elements, means to couple inductively each of the elements in one of said driver groups to all of said driven magnetic elements which correspond to the elements of a different column of said matrix, means to couple inductively each of the said elements in the other of said driver groups to all of said driven magnetic elements which correspond to the elements of a different row of said matrix, and means selectively to change the polarity of magnetization of a desired one element in each of said driver groups whereby there may be effectuated a change in the polariy of magnetization by current coincidence of a driven magnetic element corresponding to the matrix element at the intersection of that column and row of said matrix to the corresponding driven magnetic elements of which said desired ones of said driver groups are coupled.

27. A system for selectively determining the polarity of magnetization of any one of a plurality of driven magnetic elements individually indentifiable as corresponding to the elements of a matrix arranged in rows and columns comprising two driver groups each of a plurality of magnetic driver elements, means to couple inductively each of the elements in one of said driver groups to all of said driven magnetic elements which correspond to the elements of a different column of said matrix, means to couple inductively each of the said elements in the other of said driver groups to all of said driven magnetic elements which correspond to the elements of a different row of said matrix, a means responsive to the change in condition of any one of said driven elements, means to change the magnetic polarity of a selected element in said one group and of a selected element in said other group simultaneously, and a means responsive to the said charge in condition responsive means to restore said selected driver elements simultaneously in response to a change in said condition and to restore said selected driver elements in sequence in response to no change in said condition.

28. A system for selectively driving to a desired magnetic condition one or more of a plurality of driven magnetic elements individually identifiable as corresponding to the elements of a matrix arranged in rows and columns, said system comprising two driver means, at least one of which includes a plurality of magnetic driver elements, and means to couple inductively each of the said driver elements to all said driven magnetic elements which correspond to the elements of a different column of said matrix, the magnetic elements of said one driver means each having a greater volume than any single said driven magnetic element.

29. A matrix system for selectively driving to a desired magnetic condition by current coincidence one or more of a plurality of driven magnetic elements individually identifiable as corresponding to the elements of a matrix arranged in rows and columns, said system comprising two driver means, at least one of which includes a plurality of magnetic driver elements, means to couple inductively each of the said driver elements to all said driven magnetic elements which correspond to the elements of a different column of said matrix, the magnetic elements of said one driver means each having a greater volume than any single said driven magnetic element, the other of said driver means comprising elements, and means to couple inductively each of the said driver elements of said other driver means to all said driven magnetic elements which correspond to the elements of a different row of said matrix.

30. A matrix system for selectively driving to a desired magnetic condition by current coincidence one or more of a plurality of driven magnetic elements individually identifiable as corresponding to the elements of a matrix arranged in rows and columns, said system comprising two driver means, at least one of which includes a plurality of magnetic driver elements, and means to couple inductively each of the said driver elements to all said driven magnetic elements which correspond to the elements of a different column of said matrix, the magnetic elements of said one driver means each having a greater volume than any single said driven magnetic element, said driven magnetic elements comprising the memory elements of a magnetic matrix memory.

31. A matrix system for selectively driving to a desired magnetic condition by current coincidence one or more driven magnetic elements each having a substantially rectangular hysteresis curve and individually identifiable as corresponding to the elements of a matrix arranged in rows and columns, said system comprising two driver means for thus driving said driven elements by current coincidence, each said driver means including a plurality of driver elements, the said driver elements of at least one of said driver means being magnetic driver elements, and means to couple inductively each of the said magnetic driver elements of said one driver means to all said driven magnetic elements which correspond to the elements of a different column of said matrix.

32. A matrix system for selectively driving to a desired magnetic condition by current coincidence one or more of a plurality of driven magnetic elements each having a substantially rectangular hysteresis curve and individually identifiable as corresponding to the elements of a matrix arranged in rows and columns, said system comprising two driver means for thus driving said driven elements by current coincidence, at least one of said driver means including a plurality of magnetic driver elements, means to couple inductively each of the said magnetic driver elements of said one means and all of said driven magnetic elements which correspond to the elements of a different column of said matrix, and means to couple each of the said driver elements of the other of said means and all of said driven magnetic elements which correspond to the elements of a different row of said matrix.

References Cited in the file of this patent

UNITED STATES PATENTS

| | | |
|---|---|---|
| 1,547,964 | Semat | July 28, 1925 |
| 2,342,886 | Murphy | Feb. 29, 1944 |
| 2,696,600 | Serrell | Dec. 7, 1954 |

OTHER REFERENCES

Progress Report (2) on EDVAC, Moore School, University of Pennsylvania, June 30, 1946, pages (PY-O-164,165) and (4–21)—(4–23). (Copy in Div. 42.)

Publication, magazine, Electronic Engineering, Dec. 1950, published in London, England; article "An Electronic Digital Computer," pages 492–498.